United States Patent Office 3,303,155
Patented Feb. 7, 1967

3,303,155
TWO-STAGE HEATING METHOD FOR PREPARING BUTADIENE-STYRENE LATEX
William R. Peterson, Houston, and Donald A. Walker, Baytown, Tex., assignors, by mesne assignments, to Ashland Oil & Refining Company, Ashland, Ky., a corporation of Kentucky
No Drawing. Filed Dec. 28, 1962, Ser. No. 247,830
2 Claims. (Cl. 260—29.7)

This invention relates to paper having a surface layer of mineral pigment adhesively bound to the paper, to the adhesives used to bind the pigment, and to a process for making such adhesives.

Mineral coated paper has a surface layer comprising a major proportion of pigment intimately mingled with a minor proportion of adhesive which anchors the pigment on the surface of the paper. This layer is applied in the form of a water dispersion of pigment and adhesive, is dried to remove the water and is then treated to develop its gloss and smoothness. In the final paper product, the mineral coating contributes brightness, opacity, surface strength, controlled ink sorption and printability. Paper of this character is especially useful in reproduction process, such as offset, letterpress, rotogravure and flexographic, which processes demand papers of highest quality.

The art of making mineral coated papers has had considerable time in which to progress, since it originated prior to 1920. Progress manifested itself, in part, in the discovery of new substitutes for well-known pigments and adhesives and in the discovery of new combinations thereof. One contribution was the discovery that styrene-butadiene latexes could be used as the adhesive material in a mineral coating. The use of styrene-butadiene latexes for this purpose has been extensive enough to place them in a position of importance, along with the natural resinous materials which have been used as adhesives since the early stages of the development of the art. Despite the degree of acceptance which has been accorded to these latexes, we have found that there is a heretofore unseen opportunity to improve them and to improve the final products into which they are incorporated.

Consequently, it is a principal object of this invention to provide superior aqueous adhesive/pigment systems for coating paper. It is a further object of this invention to produce a styrene-butadiene adhesive which leads to superior properties in mineral coated papers which include it. An additional object is to provide a novel method of polymerizing styrene-butadiene monomers to produce a latex of improved adhesive properties. Another object is the production of improved coated papers.

In accordance with this invention, these objects have been met in a particularly effective manner. In general, the method of this invention involves conducting an emulsion polymerization reaction between styrene and butadiene monomers in a heated pressure vessel in the presence of emulsifier and other polymerization aids, by maintaining the temperature conditions within the vessel at a lower level during the early stages of the reaction and by raising the temperature to a higher level when a pre-selected degree of monomer conversion has been attained. The novel products of the present invention are the product of the above process and the paper coating formulations and coated paers which are manufactured therefrom.

A more complete understanding of the invention may be obtained by reference to the more detailed description thereof which follows. All parts are by weight unless the contrary is clearly indicated.

To conduct an emulsion polymerization reaction in accordance with the basic process of the present invention, one usually begins by charging the monomers, styrene and butadiene, either mixed or separately into a pressure vessel containing water and provided with heating and agitation equipment. They may be charged all at once or step-wise. In fact, the exact type of equipment and the manner of charging materials is of no great importance and may be varied at will.

The total charge of monomers will usually contain 50 to 65% styrene and 50–35% of butadiene. A preferred range is 55–60% styrene and 45–40% butadiene. Emulsifier and, if desired, other polymerization aids, will also be added. The emulsifier may include one substance or a blend of two or more substances, which are capable of producing a colloidal water-dispersion of the monomers. The added polymerization aids serve to help maintain the emulsion during the course of the reaction and to encourage and direct the formation of polymers from the monomers. The amounts and kinds of emulsifier and polymerization aids to be used are susceptible of wide variation, since the present invention appears to be applicable to any emulsion polymerization recipe for styrene-butadiene paper coating adhesives.

By way of example, a number of emulsifiers and polymerization aids will be mentioned. Among the many suitable kinds of emulsifiers are soaps, sulfonated long-chain alcohols and ethylene oxide condensates of phenols. To protect the emulsion against "breaking," precipitation of the colloidal dispersion, protective colloids sometimes referred to as "stabilizers," may be used. Starch, water soluble resins, casein, polyvinyl alcohol, hydroxyethyl cellulose and the like are suitable stabilizers. The addition of a buffer, usually a phosphate, carbonate or acetate, will also contribute to stability by maintaining the pH of the reaction mass within a range which encourages dispersion.

The additives which may be used to encourage and direct the polymerization reaction are catalysts, reaction regulators and surface tension regulators. They respectively speed the formulation of polymer nuclei, encourage or dischourage cross-linking and side reactions and control the size of the colloidal polymer particles which are produced. The catalysts may include one or more members from the group comprising ozone, oxygen, persulfates, peroxides and perborates. Chlorinated aliphatics, such as carbon tetrachloride and hexachloroethane are effective reaction regulators. The surface tension regulating function can be fulfilled by adding aromatic alcohols or amines or aliphatic alcohols having five to eight carbon atoms. These are representative of the many kinds of additives which can be included in the polymerization recipe.

When the ingredients have been charged, they should be heated to and be held within a temperature range of about 115° F. to about 130° F., preferably between 120° F. and 122° F. The reaction between the monomers will proceed at this temperature. As the reaction proceeds, the total solids content should be sampled and determined periodically in accordance with the usual laboratory procedures. From the solids content of the emulsion, it is possible to compute the percentage of monomers converted, based upon the total monomers charged. When the percentage of conversion of monomers reaches a point in the range of about 15–30%, preferably 24–26%, the first temperature stage of the reaction has been completed. At the completion of the first stage, the temperature is raised by heating the contents of the vessel to a temperature within the range of about 145° F. to 155° F., preferably 150° F. to 152° F. The reaction is thereby caused to proceed in a second temperature stage. The reaction proceeds in this temperature stage until the desired degree of reaction between the monomers has been attained. Ordinarily, the reaction proceeds to completion during the second temperature stage, for reasons of economy.

After the reaction has been completed to the desired extent, any excess monomers and low molecular weight products may be "stripped" from the resultant latex. One or more post-stabilizers, alkali metal salts of alkyl aryl sulfonates or ethylene oxide adducts of alkylated phenols, such as Nekal BX–78 or Nekal BA–75 and Igepal CO–630, may also be added at this point. However, as will soon become apparent, the addition of the post-stabilizer need not be confined to this particular point in the process. In an advantageous modification of our invention, a portion of the post-stabilizer is charged into the reactor while the reaction is still in progress.

In practicing this modified form of the invention one charges the reactants and conducts the reaction in the same manner as described above up to and including the beginning of the second temperature stage. From that point, the reaction is continued as before. In this case, however, careful watch over the percentage of monomer conversion is continued even after the transition between the first and second stages. When the conversion of monomers reaches about 55 to 65%, then about ¼ to ⅔ of the post-stabilizer is added. The addition may occur all at once or in increments, the latter practice being preferred. From this point on, the reaction, the stripping of monomers and addition of the remaining post-stabilizer may continue as before.

In another modification, incremental addition of a post-stabilizer, as from 1 to 1.5 parts Nekal BX–78 is started when the conversion of monomers is 10–26% completed, preferably at about 14%. This addition should be completed when the conversion of monomers reaches 40–70%, preferably by the time conversion reaches 55%. The amount of BX–78 added as post-stabilizer is correspondingly reduced to 1–0.5 part. In all other respects, this modification is similar to the basic process described above.

Once the latex has been produced in accordance with the basic process or a modification thereof, it is ready for formulation with a pigment, and possibly with added adhesive materials, into an aqueous adhesive/pigment coating system. By "added adhesive" we refer to natural and synthetic adhesives other than those produced in accordance with the staged temperature process described above. While the latexes of the present invention may serve with advantage as the sole adhesive in a coating formulation, it has been a standard practice in the art to formulate paper coatings in which the adhesive component comprises a styrene-butadiene latex plus one or more added adhesives such as casein, soya protein, animal hide glue, dextrin, starch and others. The protein-type adhesives are readily dispersed with the aid of a monovalent alkali. Starch and modified starches may be used in the company of latex provided the latex has been properly stabilized to guard against precipitation.

The adhesives produced according to the present invention will be found compatible with most coating clays, calcium carbonate, titanium dioxide, other white pigments containing only small amounts of free multi-valent ions, such as aluminum, iron, barium, etc., carbon black, phthalocyanine dyes, iron oxides, chromium oxide, cadmium sulfide and cadmium lithopone colors and many others.

The blending of the adhesive and pigment may be accomplished in accordance with any method capable of producing a homogeneous dispersion without coagulating the latex. The art is aware of a variety of conventional techniques for accomplishing this objective.

The preparation of a paper coating dispersion requires some degree of care, since the intimacy and uniformity of the mixture and the size of the particles therein exert noticeable effects upon the adhesivity and printing qualities of the coating. The order of adding the constituents also affects the quality of the coating in many cases. The chief point to be remembered is that the latex is preferably added last, so as to minimize the amount of shearing action that is exerted on the latex and to avoid severe foaming problems. Shearing forces tend to break the colloidal dispersion in the latex. Once coagulated, it is very difficult, if not impossible, to return it to a usable form.

The formulation can be mixed in many different kinds of equipment. One common apparatus is an open tub with a paddle mixer. The pigment is dispersed in water, frequently about one to two times the weight of the pigment. Sufficient water should be used so that the solids content will be about 30 to 70% when all the adhesive and pigment have been combined. Often 0.3 to 0.5% of a dispersing agent, based on the pigment, aids in making the dispersion. Grinding will sometimes be found helpful. Suitable dispersing agents may be found among the complex phosphates, such as tetra-sodium pyrophosphate. Calgon and Quadrafos can also be used. Deformers can be added at this point.

If an added adhesive is used, it can be dispersed in a similar fashion either independently or in the presence of the pigment dispersion. Once good dispersions are obtained, the added adhesive dispersion (if dispersed independently) is added to the pigment dispersion under agitation. Mixing is continued until a uniform mixture is obtained. In the meantime the pH may be adjusted with the aid of a buffer to guard against precipitation of the latex when it is incorporated into the mixture. The mixture should be milled if necessary. When the above steps are completed and the latex has been prepared and stabilized, they may be combined with mixing. It should be borne in mind that mixing should be held to the minimum amount required to uniformly incorporate the latex for the reasons set forth above. Of course, if no added adhesive is used, the latex will be added directly to the pigment dispersion. The aqueous adhesive/pigment system is now ready for application to the coating base paper.

When the dispersion containing the adhesive or adhesives and pigment or pigments has been applied to paper and dried, the major portion of the weight of the coating, over half, will be attributable to pigment material, usually 75 to 95%. A minor portion of the coating weight, usually 5 to 25%, will be accounted for by the adhesive component, including the latexes of the present invention and, optionally, an added adhesive. When added adhesive is included in the adhesive component, it will ordinarily constitute up to ⅘ of the total weight thereof. Although the use of larger fractions of added adhesive is possible, smaller fractions are preferred in order to retain a larger manifestation of the advantages of the latex adhesive produced in accordance with the invention.

The invention may be used with almost any kind of smooth paper or paper board. For example, the paper usually employed in fine reproduction work includes a strength stock, such as sulfite, sulfate and/or rag pulp, plus filler fibers such as soda pulp, groundwood and often some de-inked stock, which has been subjected to light beating. The properties usually considered desirable in coating base papers are minimum curling tendency, good fold and tear strength, a density and a porosity such as to permit penetration of the coating without bleeding and proper moisture content (usually considered to be about 10 to 20%) to give good adhesive acceptance properties. The paper or paper board may be filled, unfilled, sized or unsized or have any other surface characteristics that would not interfere with acceptance of the mineral coating.

The coating operation can be performed in any conventional type of paper coating apparatus, such as a dip coater, bead coater, knife coater, trailing blade coater, air knife, spray coater, vibrating brush coater, roll coater, reverse roll coater or print roll coater. The exact type of machine used is immaterial for purposes of defining the invention. These machines usually apply about one to seven pounds of coating material per 1000 square feet of paper, depending on the type of paper and its intended use.

After coating, the paper or paper board is dried in a tunnel or festoon-type hot air system or on steam heated rolls or in any other convenient manner. The drying operation serves to "set" the coating by heating it and evaporating the water therefrom. Once dried, the paper can be subjected to one or more treatments to develop gloss, if necessary. The kind and extent of such treatment often depend on the nature of the pigment and the type of coating equipment. When a gloss treatment is applied, it usually comprises a light or medium calendering treatment. Then the paper is wound in rolls or stacked in sheets and is made ready for storage or sale to a printer.

The printer is concerned with the appearance of what he prints. Understandably, the quality of the coating on a fine reproduction paper or paper board affects its suitability for letterpress, offset, flexographic, rotogravure and other fine reproduction processes. Because these processes employ rather sticky inks, there is a tendency for the inked printing member to tear clumps of paper fibers from the stock. This deleterious occurrence is known as "picking" and the degree of success with which the paper resists this tendency is known as "pick resistance." The coating should have good resistance to moisture. The coating should rapidly absorb oil, since oil is the vehicle of most printing inks and because unreasonably slow oil absorption makes it difficult for the ink to take on the paper in high speed printing. While rapid ink absorption is of value, it should not proceed too far into the paper or fuzziness and bleeding will result. The relative ability of a paper coating to resist these defects is known as "ink hold-out." Finally, the paper should have good "printability," printability being the cumulative effect of the above variables and many other variables, all of which contribute to the quality and sharpness of the printed material.

The superiority of results obtained with the method and products of the present invention may best be assessed in the light of their effects upon the above-noted properties of coated paper. Therefore, we will now give certain examples and test results comparing the performance of paper coatings containing the styrene-butadiene adhesive product of the present invention against paper coatings embodying a conventional styrene butadiene adhesive.

*Example I*

A polymerization recipe is made up as follows:

| | Parts |
|---|---|
| Butadiene | 40.0 |
| Styrene | 60.0 |
| $K_2S_2O_8$ | 0.4 |
| Triton X-405 | 3.0 |
| Atlas G-3300 | 1.0 |
| Santomerse SX | 1.0 |
| TPP | 1.0 |
| Water | 114.2 |

All the materials are charged into a 20 gallon reactor. The mixture is agitated and is brought to 150° F. The reaction temperature is maintained at the same temperature until there has been a 100% conversion of monomers. After stripping to remove low-molecular weight products, the resultant latex is treated with a post-stabilization mix of 2 parts of NeKal BA-75 and 1 part of Igepal CO-530. This latex is regarded as a "control" in the comparative tests which follow.

*Example II*

An emulsion polymerization recipe identical to that used in Example I is polymerized, stripped and post-stabilized in the same manner as described therein, with one exception. The reactor is initially heated to a temperature of 120° F. and is held at that temperature until the monomers are 30% converted. At that point the temperature is raised to 150° F. and is maintained at 150° F. until 100% conversion of monomers has been achieved. The resultant latex is designated sample A prepared in accordance with the invention.

*Example III*

A third polymerization recipe is made up as follows:

| | Parts |
|---|---|
| Butadiene | 40.0 |
| Styrene | 60.0 |
| $K_2S_2O_8$ | 0.4 |
| Triton X-405 | 2.0 |
| SRS-55 | 1.0 |
| Renex 697 | 2.0 |
| TPP | 1.0 |
| Water | 114.2 |

This recipe is treated in the same manner as the recipe for latex A of Example II, except that at 60% conversion of monomers, 1 part of NeKal BX-78 is added and the amount of NeKal BX-78 added after stripping is correspondingly reduced. The resultant latex is designated sample B, prepared in accordance with the invention.

*Example IV*

Aqueous adhesive/pigment coating systems are prepared using latexes A and B and the control latex. A master mix is prepared by charging 500 parts of water into a mixer. The water is followed by 0.6 part of ammonium hydroxide. With moderate agitation 1.2 parts of Calgon are added. Under full agitation 300 parts of coating clay are charged into the mixer, followed by 22.5 parts of casein. The casein is added as a 20% solution in water, solubilized with concentrated ammonium hydroxide. Mixing is continued until a uniform dispersion is obtained. The resultant dispersion is then divided into three identical portions designated "Control," "A" and "B."

To the control dispersion is added sufficient Control latex so that it will include 12.0 parts of latex solids. While the latex is being incorporated into the dispersion with gentle mixing, sufficient water is added to bring the total water content of the dispersion to 182.0 parts. Latexes A and B are added to dispersions A and B respectively in the same manner, the water content of each being brought up to 182.0 parts. Thus, three aqueous adhesive/pigment coating systems are prepared, each having the following formula:

| | Parts |
|---|---|
| Coating clay (kaolinite) | 100 |
| Calgon | 0.4 |
| Ammonium hydroxide | 0.2 |
| Casein | 7.5 |
| Latex solids | 12.0 |
| Water | 182.0 |

Each of the three coating formulations is then applied to test sheets of a typical commercial coating base paper with a wire-wound draw-down rod type of coater. Care is exercised to maintain a uniform density and thickness of coating. The coated sample sheets are marked Control, A and B to correspond to the designation of the latex in each case. The coated sheets are then dried for 2 minutes at 150° C. After drying, the average dry weight of the deposited coating materials is determined and is found to be 6.4 pounds of coating per 500 ream of 13½" x 18" paper, plus or minus 0.2 pound per ream. The sample sheets are then prepared for evaluation.

Pre-evaluation conditioning is in conformity with ASTM Standard Method D685-44. Uniform temperature (70° F.) and humidity (50%) are maintained throughout the tests. Print quality is evaluated by visual comparison of proofs made on a Vandercook Universal I Proof Press using a typical flat ink.

The relative pick resistance of the sample sheets is found by subjecting them to the Dennison Wax Pick Test, Tappi Routine Control Method, RC–6. Additional measurements of pick resistance, both wet and dry, are conducted with the aid of an I.G.T. Printability Tester. Standard industry procedures are adhered to throughout the runs on the I.G.T. Tester, and the ink adopted for these tests is I.P.I. No. 6 tack-graded ink. All pick resistance tests are performed on the "wire" sides of the paper samples. Wet-rub resistance and ink hold-out are determined by Tappi Routine Control Methods, RC–185 and RC–19 respectively.

Good correspondence is obtained in the test results among the samples coated with each of the three aqueous adhesive/pigment coating systems evaluated. The results are summarized in the following table:

| Sample Designation | Print Quality | Pick Test | Wet Rub | Ink Hold-out Test |
|---|---|---|---|---|
| Control | Poor | Poor | Poor | Poor. |
| A | Good | Good | Good | Good. |
| B | do | do | do | Do. |

The test results clearly demonstrate the superiority of papers having mineral coatings containing adhesives prepared in accordance with the polymerization process described herein.

The extent of the conversion of monomer to polymer in the practice of this invention can be conveniently determined by measurement of the total solids content of the polymerization recipe. This is conveniently done during operation by withdrawing very small aliquots of the polymerizing mass and determining total solids by evaporation of the liquid contents. The aliquot is transferred into a tared dish, the liquid contents evaporated off at 160° C. and the total solids determined. Since the preponderance of the residual solids is polymer the mass measurement can be reasonably accurately translated to percent conversion.

Numerous modifications and alterations can be made in the instant process by those skilled in the art without departing from the spirit and scope of this invention.

We claim:
1. A method of preparing a styrene-butadiene resin latex by the emulsion polymerization of a monomer containing by weight about 50–65% of styrene and about 50–35% of butadiene, which comprises initially conducting the polymerization at a temperature of about 115–130° F. for a time sufficient to obtain about 15–30% monomer conversion, and thereafter continuing the polymerization at a temperature of about 145–155° F. until the desired degree of monomer conversion has been obtained.

2. A method of preparing a styrene-butadiene resin latex by the emulsion polymerization of a monomer containing by weight 55–60% of styrene and 45–40% of butadiene, which comprises initially conducting the polymerization at a temperature of 120–122° F. for a time sufficient to obtain 24–26% monomer conversion, and thereafter continuing the polymerization at a temperature of 150–152° F. until the desired degree of monomer conversion has been obtained.

References Cited by the Examiner

UNITED STATES PATENTS

| | | | |
|---|---|---|---|
| 2,876,203 | 3/1959 | Miller et al. | 260—29.7 |
| 3,081,198 | 3/1963 | Miller | 260—8 |
| 3,115,438 | 12/1963 | Randall | 117—155 |

WILLIAM H. SHORT, *Primary Examiner.*

J. NORRIS, E. M. WOODBERRY, *Assistant Examiners.*